US012424194B2

(12) United States Patent
Huang et al.

(10) Patent No.: US 12,424,194 B2
(45) Date of Patent: Sep. 23, 2025

(54) NOISE CANCELLATION METHOD AND APPARATUS, ELECTRONIC DEVICE, NOISE CANCELLATION HEADSET, AND STORAGE MEDIUM

(71) Applicant: Lanto Electronic Limited, Kunshan (CN)

(72) Inventors: Che-Yung Huang, Kunshan (CN); Chi-Liang Chen, Kunshan (CN); Yong-Sheng Jheng, Kunshan (CN); Che-Yi Hsiao, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 303 days.

(21) Appl. No.: 18/130,219

(22) Filed: Apr. 3, 2023

(65) Prior Publication Data

US 2024/0127783 A1 Apr. 18, 2024

(30) Foreign Application Priority Data

Oct. 18, 2022 (CN) ......................... 202211277253.4

(51) Int. Cl.
*G10K 11/178* (2006.01)
*G10L 21/0208* (2013.01)
*G10L 25/84* (2013.01)

(52) U.S. Cl.
CPC ........ *G10K 11/178* (2013.01); *G10L 21/0208* (2013.01); *G10L 25/84* (2013.01)

(58) Field of Classification Search
CPC ........... G10K 11/178; G10K 11/17827; G10K 11/17837; G10K 11/17885;
(Continued)

(56) References Cited

U.S. PATENT DOCUMENTS

2010/0131269 A1* 5/2010 Park ................. G10K 11/17857 381/71.1
2018/0190258 A1* 7/2018 Mohammad ............ G10L 15/02
(Continued)

FOREIGN PATENT DOCUMENTS

CN 111710330 A 9/2020
CN 112040383 A 12/2020
(Continued)

OTHER PUBLICATIONS

Taiwanese Office Action and Search Report for Taiwanese Application No. 111145829, dated Apr. 23, 2024, with English translation of the Office Action.
(Continued)

*Primary Examiner* — Jason R Kurr
(74) *Attorney, Agent, or Firm* — Birch, Stewart, Kolasch & Birch, LLP

(57) ABSTRACT

Provided are a noise cancellation method and apparatus, an electronic device, a noise cancellation earphone, and a storage medium. The method includes acquiring original sound source information; performing noise reduction (NR) processing on the original sound source information using active noise cancellation (ANC) to obtain first sound information and performing the NR processing on the original sound source information using environmental noise cancellation (ENC) to obtain second sound information; and mixing and adding the first sound information and the second sound information to obtain target sound information and playing the target sound information. In this method, the NR processing can be performed on the sound using the ANC and the ENC, thereby distinguishing environmental noise from human voice, improving the noise cancellation performance, and enabling a user to hear clearer sound.

16 Claims, 5 Drawing Sheets

(58) Field of Classification Search
CPC ............. G10L 21/0208; G10L 21/0316; G10L 21/034; G10L 21/0364; H04R 1/1083
See application file for complete search history.

(56) References Cited

U.S. PATENT DOCUMENTS

| | | | | |
|---|---|---|---|---|
| 2022/0284877 | A1 | 9/2022 | He et al. | |
| 2023/0066600 | A1* | 3/2023 | Sha | G10K 11/17885 |
| 2023/0129322 | A1* | 4/2023 | Sha | H04R 3/005 |

FOREIGN PATENT DOCUMENTS

| | | | |
|---|---|---|---|
| CN | 112399301 | A | 2/2021 |
| CN | 114071306 | A | 2/2022 |
| TW | 201719636 | A | 6/2017 |
| TW | 202209305 | A | 3/2022 |

OTHER PUBLICATIONS

Chinese Office Action and Search Report for Chinese Application No. 202211277253.4, dated May 14, 2025, with English translation.

* cited by examiner

NOISE CANCELLATION METHOD AND APPARATUS, ELECTRONIC DEVICE, NOISE CANCELLATION HEADSET, AND STORAGE MEDIUM

CROSS-REFERENCE TO RELATED APPLICATION(S)

This application claims priority to Chinese Patent Application No. 202211277253.4 filed Oct. 18, 2022, the disclosure of which is incorporated herein by reference in its entirety.

TECHNICAL FIELD

The present disclosure relates to the field of audio processing technologies and, in particular, to a noise cancellation method and apparatus, an electronic device, an earphone and a storage medium.

BACKGROUND

In some earphone-related products, such as a headset, an on-ear earphone, an in-ear earphone, an auxiliary hearing device, or a hearing aid, an original sound signal generally acquired contains noise, and directly transmitting the original sound signal to the user may cause interference.

In the related art, generally, noise cancellation is performed on the original sound signal through active noise cancellation (ANC). However, the noise cancellation by the ANC alone cannot achieve the effect of distinguishing the environment from the human voice, resulting in a poor noise cancellation performance, and the sound heard by the user remains noisy.

SUMMARY

The present disclosure provides a noise cancellation method and apparatus, an electronic device, a noise cancellation earphone, and a storage medium, so as to improve noise cancellation performance and make a user hear clearer sound.

According to an aspect of the present disclosure, a noise cancellation method is provided and includes the steps described below.

Original sound source information is acquired.

Noise reduction (NR) processing is performed on the original sound source information using active noise cancellation (ANC) so as to obtain first sound information and the NR processing is performed on the original sound source information using environmental noise cancellation (ENC) so as to obtain second sound information.

The first sound information and the second sound information are mixed and added so as to obtain target sound information and the target sound information is played.

According to another aspect of the present disclosure, a noise cancellation apparatus is provided. The apparatus includes an original sound source information acquisition module, a noise reduction processing module, and a sound playing module.

The original sound source information acquisition module is configured to acquire original sound source information.

The noise reduction processing module is configured to perform noise reduction (NR) processing on the original sound source information using active noise cancellation (ANC) to obtain first sound information and perform the NR processing on the original sound source information using environmental noise cancellation (ENC) to obtain second sound information.

The sound playing module is configured to mix and add the first sound information and the second sound information to obtain target sound information and play the target sound information.

According to another aspect of the present disclosure, an electronic device is provided. The electronic device includes at least one processor and a memory communicatively connected to the at least one processor.

The memory stores a computer program executable by the at least one processor to enable the at least one processor to perform the noise cancellation method according to any embodiment of the present disclosure.

According to another aspect of the present disclosure, a noise cancellation earphone is provided and includes a microphone, a noise reduction processor, and a speaker.

The microphone is configured to acquire original sound source information.

The noise reduction processor is configured to perform noise reduction (NR) processing on the original sound source information using the method according to any embodiment of the present disclosure to obtain target sound information.

The speaker is configured to play the target sound information using the method according to any embodiment of the present disclosure.

According to another aspect of the present disclosure, a noise cancellation earphone is provided and includes a first microphone, a second microphone, a noise reduction processor, and a speaker.

The first microphone is configured to acquire first sound source information.

The second microphone is configured to acquire second sound source information.

The noise reduction processor is configured to perform active noise cancellation (ANC) noise reduction (NR) processing on the first sound source information according to the second sound source information to obtain third sound information.

The noise reduction processor is further configured to use the first sound source information as original sound source information and perform environmental noise cancellation (ENC) NR processing using the method according to any embodiment of the present disclosure to obtain second sound information.

The noise reduction processor is further configured to mix and add the third sound information and the second sound information to obtain target sound information.

The speaker is configured to play the target sound information using the method according to any embodiment of the present disclosure.

According to another aspect of the present disclosure, a non-transitory computer-readable storage medium is provided. The computer-readable storage medium is configured to store a computer instruction which, when executed by a processor, causes the processor to perform the noise cancellation method according to any embodiment of the present disclosure.

In the technical solutions of embodiments of the present disclosure, original sound source information is acquired; NR processing is performed on the original sound source information using ANC so as to obtain first sound information; the NR processing is performed on the original sound source information using ENC so as to obtain second sound information; and the first sound information and the second sound information are mixed and added so as to obtain target sound information and the target sound information is played. In this manner, the problem of noise cancellation is solved, and the NR processing is performed on the sound using the ANC and the ENC, thereby distinguishing environmental noise from human voice, improving the noise cancellation performance, and enabling a user to hear clearer sound.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

To illustrate technical solutions in embodiments of the present disclosure more clearly, the drawings used in description of the embodiments are described below. Apparently, the drawings described below merely illustrate part of the embodiments of the present disclosure, and those of ordinary skill in the art may obtain other drawings based on the drawings described below on the premise that no creative work is done.

DETAILED DESCRIPTION

For a better understanding of the solutions of the present disclosure by those skilled in the art, the technical solutions in embodiments of the present disclosure are described clearly and completely below in conjunction with the drawings in the embodiments of the present disclosure. Apparently, the embodiments described below are part, not all, of the embodiments of the present disclosure. Based on the embodiments of the present disclosure, all other embodiments obtained by those of ordinary skill in the art on the premise that no creative work is done are within the scope of the present disclosure.

It is to be noted that the terms "first", "second", "original", "target", and the like in the description, claims and the preceding drawings of the present disclosure are used for distinguishing between similar objects and are not necessarily used for describing a particular order or sequence. It should be understood that the data used in this way is interchangeable where appropriate so that the embodiments of the present disclosure described herein may also be implemented in a sequence not illustrated or described herein. In addition, terms "including" and "having" or any variations thereof are intended to encompass a non-exclusive inclusion. For example, a process, method, system, product or apparatus that includes a series of steps or units not only includes the expressly listed steps or units but may also include other steps or units that are not expressly listed or are inherent to such a process, method, product or apparatus.

Embodiment One

Figure 1A:
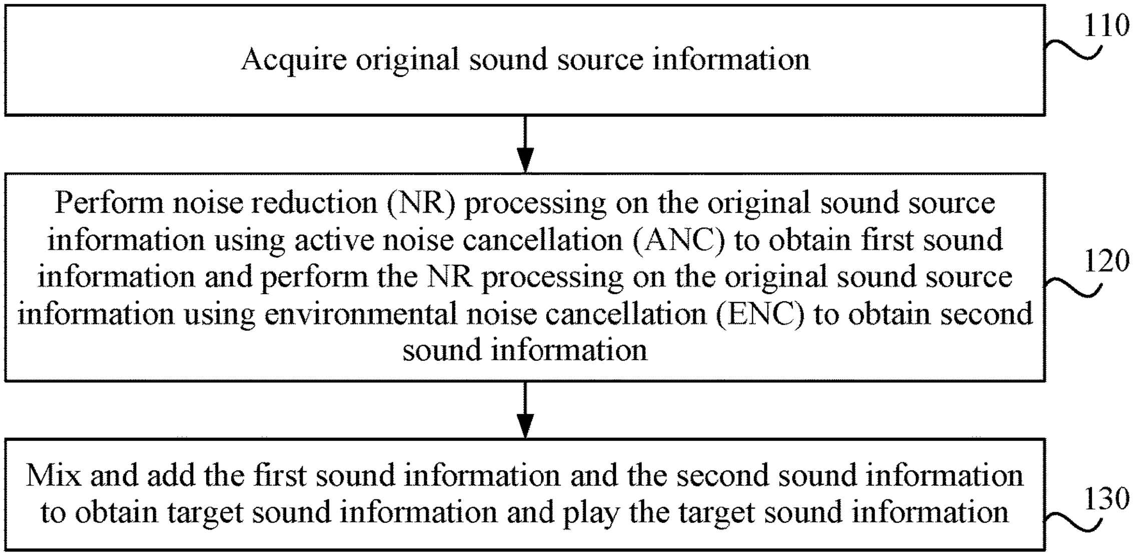
FIG. 1A is a flowchart of a noise cancellation method according to embodiment one of the present disclosure.

FIG. 1A is a flowchart of a noise cancellation method according to embodiment one of the present disclosure. This embodiment is applicable to the case of noise cancellation in an earphone-related product. The method may be performed by a noise cancellation apparatus. The noise cancellation apparatus may be implemented by hardware and/or software and may be configured in an electronic device, such as an earphone, a computer, and a mobile phone. As shown in FIG. 1A, the method includes the steps described below.

In step 110, original sound source information is acquired.

The original sound source information may be information including environmental noise and human voice. Specifically, the original sound source information may be generated by collecting sounds in the environment through a microphone.

Specifically, in an embodiment in the embodiments of the present disclosure, the step of acquiring the original sound source information includes acquiring a sound signal of an original sound source through a microphone and converting the sound signal of the original sound source into an electrical signal of the original sound source; and converting the electrical signal of the original sound source into a digital signal of the original sound source through an analog-to-digital converter (ADC) and using the digital signal of the original sound source as the original sound source information.

Here, the human voice and the noise included in the original sound source are mixed and can be acquired by the microphone (such as an FF microphone (FF MIC)) at the same time. The microphone may convert the sound signal into the electrical signal. The electrical signal may be converted into the digital signal through the ADC, and the digital signal may be simultaneously distributed to active noise cancellation (ANC) and environmental noise cancellation (ENC) for operation, thereby facilitating noise reduction processing on the sound.

In step 120, noise reduction (NR) processing is performed on the original sound source information using active noise cancellation (ANC) so as to obtain first sound information and the NR processing is performed on the original sound source information using environmental noise cancellation (ENC) so as to obtain second sound information.

The ANC may perform digital signal processing on the original sound source information to generate anti-noise with the same noise magnitude and the opposite phase, so as to use the anti-noise to cancel the original noise, thereby achieving the NR. However, the ANC in the related art does not distinguish the environmental noise from the human voice, but cancels both the environmental noise and the human voice, resulting in a poor sound effect acquired by a user.

The ENC can process the original sound source information using an ENC chip, distinguish the human voice from the environmental noise, retain only the human voice, and cancel the environmental noise. However, the digital signal processing is performed by the ENC alone to achieve the NR, resulting in a long required operation duration, such as 30 to 50 milliseconds. Due to the delay in the ENC operation, the user easily perceives two pieces of sound: the original sound source and sound after the delay in the operation. Thus, the user experience is rather poor.

In the embodiment of the present disclosure, the NR processing is performed on the original sound source information using both the ANC and the ENC so that the processing duration of the ENC can be reduced based on the NR using the ANC. Therefore, the problem that the environmental noise cannot be separated from the human voice and is cancelled together with the human voice due to the use of the ANC alone can be avoided. The problem that efficient environmental noise cancellation cannot be achieved due to the use of the ENC alone for NR processing can also be avoided. Moreover, when the user uses an earphone at the near end, the problem that external noise penetrates from the outside to the ear of the user due to the relatively long processing duration of the ENC, causing the user to perceive two pieces of sound can be avoided. To sum up, the original sound source information is processed using both the ANC and the ENC so that the effect that the signal processing is clearer and the complete human voice is retained can be achieved, and the user can hear external human voice more clearly.

In step 130, the first sound information and the second sound information are mixed and added so as to obtain target sound information and the target sound information is played.

In the method according to the embodiment of the present disclosure, sound information obtained by the ANC processing and sound information obtained by the ENC processing are mixed, a complete and clean human voice can be obtained, the problem of noisy listening sounds in a transparency mode of an earphone, an auxiliary hearing device, or a hearing aid in the related art can be solved, the environmental noise cancellation effect is enhanced, and the human voice is enhanced so that the user can hear clearer external human voice.

Specifically, in an embodiment in the embodiments of the present disclosure, the step of mixing and adding the first sound information and the second sound information to obtain the target sound information includes converting the mixed and added sound information into a target electrical signal through a digital-to-analog converter (DAC) and converting the target electrical signal into a target sound signal through a speaker to obtain the target sound information.

The DAC can convert the mixed and added signal processed by the ANC and the ENC into the electrical signal. Further, the DAC-converted electrical signal may be transmitted to the speaker. The speaker can convert the electrical signal into the sound signal and play the sound signal.

In the technical solutions of this embodiment, original sound source information is acquired; NR processing is performed on the original sound source information using ANC so as to obtain first sound information; the NR processing is performed on the original sound source information using ENC so as to obtain second sound information; and the first sound information and the second sound information are mixed and added so as to obtain target sound information and the target sound information is played. In this manner, the problem of noise cancellation is solved, and the NR processing is performed on the sound using the ANC and the ENC, thereby distinguishing environmental noise from human voice, improving the noise cancellation performance, and enabling the user to hear clearer sound.

Figure 1B:
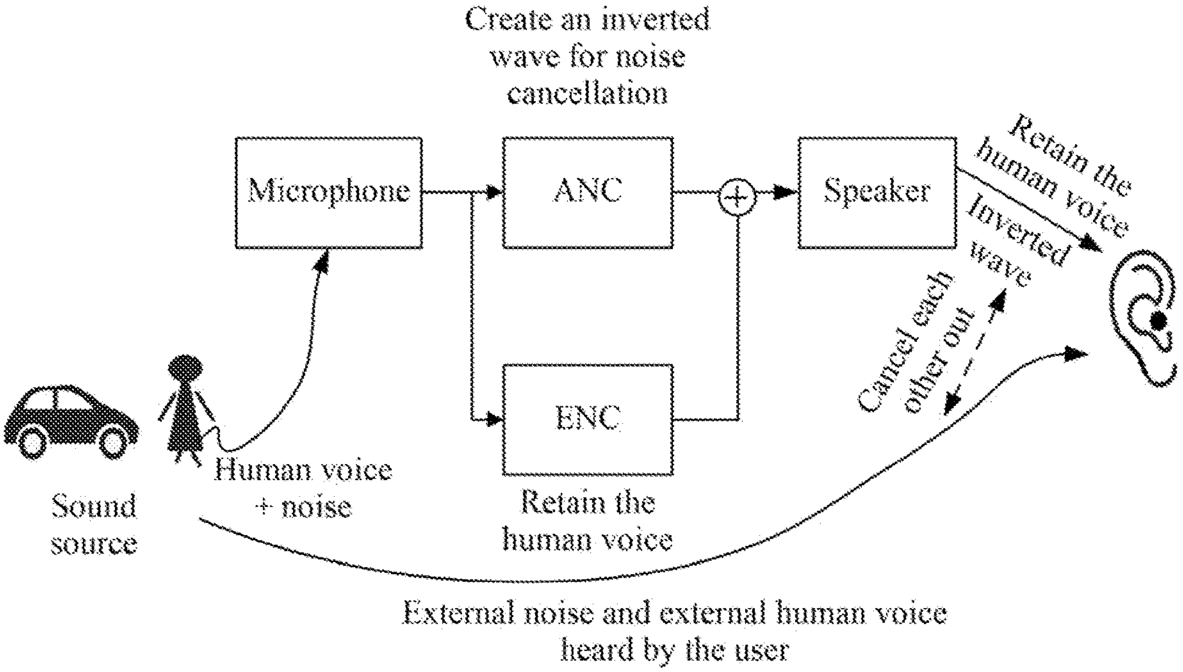
FIG. 1B is a flowchart of another noise cancellation method according to embodiment one of the present disclosure.

FIG. 1B is a flowchart of another noise cancellation method according to embodiment one of the present disclosure. As shown in FIG. 1B, the microphone may pick up an external signal. In this case, due to the human voice cannot be distinguished from the environmental noise, if the user directly hears the external signal, the user may feel noisy. In the technical solutions of the embodiments of the present disclosure, voice signal processing may be performed in conjunction with respective features of the ANC and the ENC. The ANC can be responsible for reducing the noise of low-frequency signals, and the ENC can perform independent processing for a voice frequency band of the human voice, retain the human voice, and reduce the operation duration. That is, the ANC achieves noise cancellation through an inverted wave, and the ENC achieves the cancellation of environmental noise. After that, signals obtained by the ANC processing and the ENC processing may be mixed together, and the mixed signals are played through the speaker, thereby solving the problem of noisy listening sounds in the transparency mode of a conventional earphone product, enhancing the environmental noise cancellation effect, enhancing the human voice, and enabling the user to hear clearer external human voice. The user is prevented from perceiving two pieces of sound based on the reduced operation duration of the ENC in the transparency mode.

Embodiment Two

Figure 2A:
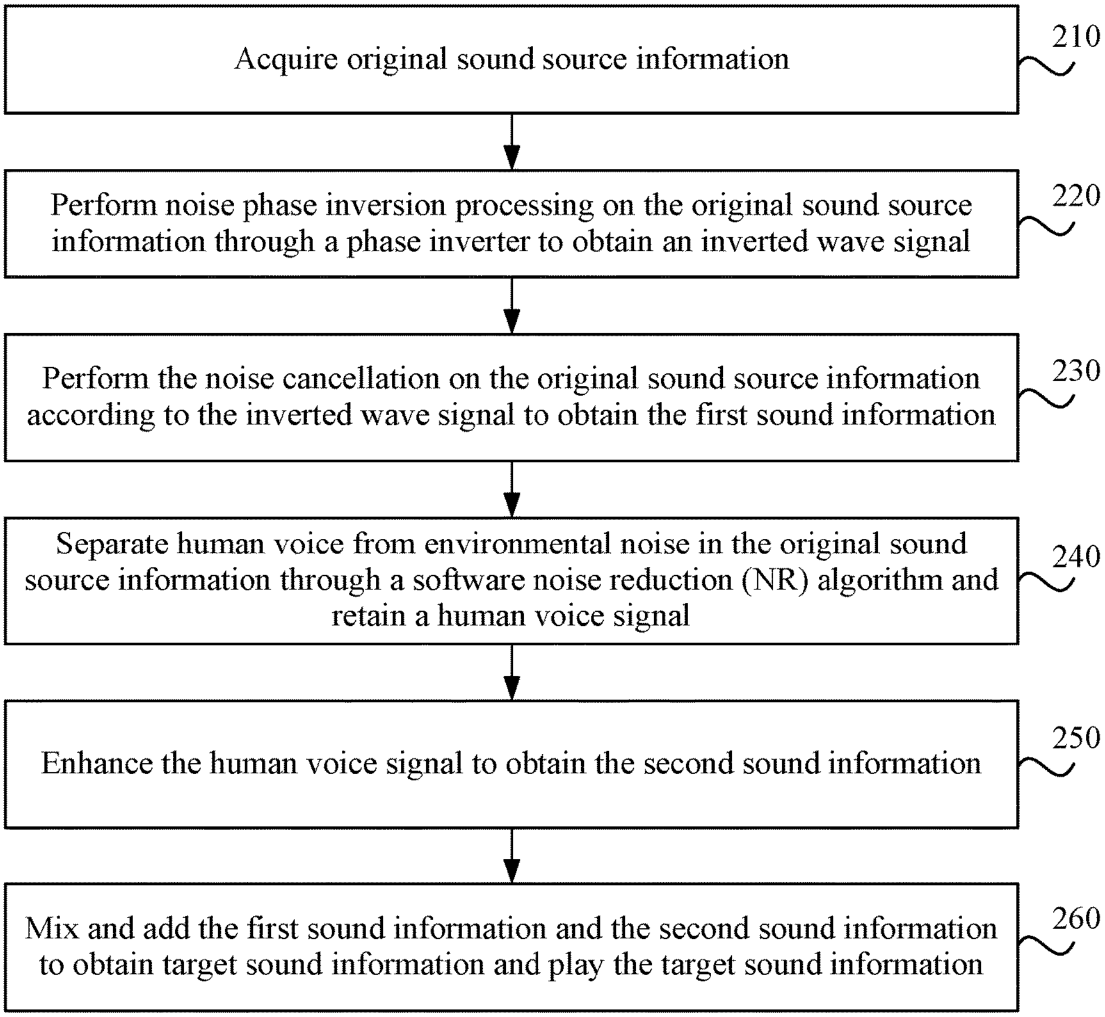
FIG. 2A is a flowchart of a noise cancellation method according to embodiment two of the present disclosure.

FIG. 2A is a flowchart of a noise cancellation method according to embodiment two of the present disclosure. This embodiment is a further refinement of the preceding technical solutions and the technical solutions in this embodiment can be combined with each optional solution in the preceding one or more embodiments. As shown in FIG. 2A, the method includes the steps described below.

In step 210, original sound source information is acquired.

In an embodiment in the embodiments of the present disclosure, the step of acquiring the original sound source information includes acquiring a sound signal of an original sound source through a microphone and converting the sound signal of the original sound source into an electrical signal of the original sound source; and converting the electrical signal of the original sound source into a digital signal of the original sound source through an analog-to-digital converter (ADC) and using the digital signal of the original sound source as the original sound source information.

In step 220, noise phase inversion processing is performed on the original sound source information through a phase inverter so as to obtain an inverted wave signal.

In an embodiment in the embodiments of the present disclosure, before the noise phase inversion processing is performed on the original sound source information through the phase inverter so as to obtain the inverted wave signal, the method further includes performing low-pass filtering on the original sound source information to obtain the original sound source information within a first target frequency band.

The low-pass filtering may be filtering the original sound source information and selecting the first target frequency band with a good ANC NR processing effect. Specifically, limited by physical characteristics such as a sound wavelength and the delay in the ANC processing of the inverted wave, the high frequency with a poor NR processing effect may be filtered out, thereby avoiding the inverse effect of high frequency inversion in the ANC processing. That is, the first target frequency band may be a low frequency band. Specifically, according to a specific study, the first target frequency band may be configured to be a frequency band ranged from 20 Hz to 4 kHz.

For a frequency band greater than 1 kHz, the faster the DSP operational speed of the ANC is, the higher the frequency that can be processed by the NR is. However, in view of the effect of avoiding the high frequency inversion, that is, the effect of preventing the original NR from changing to increasing noise, in the embodiment of the present disclosure, the ANC processes the original sound source information ranged from 20 Hz to 4 kHz through a low-pass filter, thereby preventing the high frequency noise from affecting the NR quality.

Specifically, in an embodiment in the embodiments of the present disclosure, the step of performing the low-pass filtering on the original sound source information to obtain the original sound source information within the first target frequency band includes performing the low-pass filtering on the original sound source information through a biquad filter to obtain the original sound source information within the first target frequency band.

The biquad filter is a filter with a transfer function in which a numerator and a denominator are both second-order polynomials. The biquad filter is used so that the sensitivity of the filter to coefficients can be avoided, and the biquad filter can be used alone to achieve a better filtering result.

After the original sound source information within the first target frequency band is obtained after the low-pass filtering is performed on the original sound source information, the phase inversion processing is performed on the filtered original sound source information through the phase inverter so as to obtain the inverted wave signal. Further, noise cancellation may be performed on the original sound source information according to the inverted wave signal so as to obtain the first sound information, thereby achieving low frequency NR.

In step 230, the noise cancellation is performed on the original sound source information according to the inverted wave signal so as to obtain the first sound information.

In an embodiment in the embodiments of the present disclosure, the step of performing the noise cancellation on the original sound source information according to the inverted wave signal to obtain the first sound information includes performing volume adjustment on the inverted wave signal through a gain adjustment to obtain a target inverted wave signal with a magnitude same as a magnitude of a noise in the original sound source information; and performing the noise cancellation on the original sound source information according to the target inverted wave signal to obtain the first sound information.

After the inverted wave signal is obtained, the volume adjustment may be performed on the inverted wave signal through the gain, and the inverted wave signal is adjusted to the target inverted wave signal with a magnitude same as a magnitude of the current residual noise in the ear. The target inverted wave signal can directly cancel the noise in the original sound source information, thereby achieving the effect of low frequency NR.

In step 240, human voice is separated from environmental noise in the original sound source information through a software NR algorithm and a human voice signal is retained.

The software NR algorithm may be an operation that retains the human voice and removes the noise. However, based on that the ANC can perform the NR processing on the original sound source information in the embodiment of the present disclosure, the residual amount of noise is already small, and the NR operation may be appropriately reduced, that is, the operation amount is reduced so as to increase the operation rate. In addition, filtering may be performed before NR, thereby further reducing the residual noise, further reducing the intensity of the NR operation, reducing the noise processing delay, and preventing the user from perceiving two pieces of sound. By way of example, the NR operation is controlled to be completed within 0 to 30 milliseconds so that the user is prevented from perceiving two pieces of sound.

Specifically, in an embodiment in the embodiments of the present disclosure, before the human voice is separated from the environmental noise in the original sound source information through the software NR algorithm and the human voice signal is retained, the method further includes performing band-pass filtering on the original sound source information to obtain the original sound source information within a second target frequency band.

The band-pass filtering may be filtering the original sound source information and selecting the second target frequency band corresponding to a human voice frequency band to perform ENC NR processing. The filter may filter the original sound source information to reduce the processing delay of the ENC, that is, to reduce the operation amount of the NR. Specifically, according to a specific study, the second target frequency band may be configured to be a frequency band ranged from 100 Hz to 8 kHz. The original sound source information within the second target frequency band is selected and processed, thereby reducing the difficulty of ENC adaptation and the processing duration of the ENC. At the same time, frequency bands that are not within 100 Hz to 8 kHz are not processed, thereby preventing the non-voice-segment noise from affecting the voice quality.

Specifically, in an embodiment in the embodiments of the present disclosure, the step of performing the band-pass filtering on the original sound source information to obtain the original sound source information within the second target frequency band includes performing the band-pass filtering on the original sound source information through a biquad filter to obtain the original sound source information within the second target frequency band.

The biquad filter is a filter with a transfer function in which a numerator and a denominator are both second-order polynomials. The biquad filter is used so that the sensitivity of the filter to coefficients can be avoided, and the biquad filter can be used alone to achieve a better filtering result.

After the band-pass filtering is performed on the original sound source information so as to obtain the original sound source information within the second target frequency band, the NR processing may be performed on the filtered original sound source information so as to obtain the human voice signal.

In step 250, the human voice signal is enhanced so as to obtain the second sound information.

The enhancement processing of the human voice signal may be to enable the user to clearly hear a clean voice signal. The enhancement processing may include multiple processing manners. Specifically, in an embodiment in the embodiments of the present disclosure, the step of enhancing the human voice signal to obtain the second sound information includes performing audio enhancement processing and/or volume enhancement processing on the human voice signal to obtain the second sound information.

The audio enhancement processing may be dynamically adjusting an amplitude of the human voice signal to make the sound softer. The volume enhancement processing may be an amplification process of a volume dimension of the human voice signal to make the sound signal louder.

Specifically, in an embodiment in the embodiments of the present disclosure, the step of performing the audio enhancement processing and/or the volume enhancement processing on the human voice signal includes performing the audio enhancement processing on the human voice signal by dynamically adjusting an audio output amplitude in multiple frequency bands. That is, the small audio is enhanced by dynamically adjusting the audio output amplitude in multiple frequency bands, and the transient excessive signal is suppressed so as to make the signal clearer.

Further, in an embodiment in the embodiments of the present disclosure, the step of performing the audio enhancement processing and/or the volume enhancement processing on the human voice signal includes performing the volume enhancement processing on the human voice signal through the gain adjustment. The volume of the human voice signal is appropriately adjusted through the gain so that the user can be more comfortable when hearing the voice and can clearly hear the voice.

In step 260, the first sound information and the second sound information are mixed and added so as to obtain target sound information and the target sound information is played.

In an embodiment in the embodiments of the present disclosure, the step of mixing and adding the first sound information and the second sound information to obtain the target sound information includes converting the mixed and added sound information into a target electrical signal through a digital-to-analog converter (DAC) and converting the target electrical signal into a target sound signal through a speaker to obtain the target sound information.

In the technical solutions of the embodiments of the present disclosure, original sound source information is acquired; noise phase inversion processing is performed on the original sound source information through a phase inverter so as to obtain an inverted wave signal; the noise cancellation is performed on the original sound source information according to the inverted wave signal so as to obtain the first sound information; human voice is separated from environmental noise in the original sound source information through a software NR algorithm and a human voice signal is retained; the human voice signal is enhanced so as to obtain the second sound information; and the first sound information and the second sound information are mixed and added so as to obtain target sound information and the target sound information is played. In this manner, the problem of noise cancellation is solved, and the ANC NR processing and the ENC NR processing are performed on the sound so that the environmental noise can be distinguished from the human voice, the noise cancellation performance can be improved, the delay in the NR processing can be reduced, and the user can hear clearer sound, thereby improving the user experience.

Figure 2B:
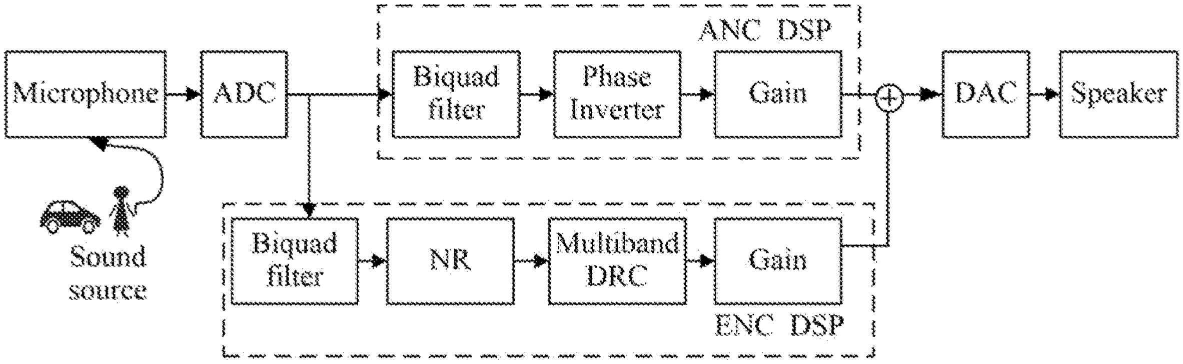
FIG. 2B is a flowchart of another noise cancellation method according to embodiment two of the present disclosure.

FIG. 2B is a flowchart of another noise cancellation method according to embodiment two of the present disclosure. As shown in FIG. 2B, the microphone can pick up the sound in the environment, where the sound in the environment includes the environmental noise and the human voice. The microphone may convert the sound in the environment from a sound signal to an electrical signal. The electrical signal may be converted into a digital signal through the ADC. The digital signal may be separately distributed to the ANC and the ENC for the operation and processing.

As shown in FIG. 2B, in the ANC part, the biquad filter adaptation may be performed on the original sound source information, and the ANC adaptation is performed on a frequency band which performs better in the NR and is selected through the low-pass filter, that is, a frequency band ranged from 20 Hz to 4 kHz. The signal with a frequency greater than 1 kHz is filtered out and not processed, thereby preventing the high frequency noise from affecting the NR quality. The phase inverter may be followed by the biquad filter so as to obtain the inverted wave signal. The volume of the inverted wave signal is adjusted through the gain so that the inverted wave signal has the noise magnitude the same as the noise magnitude of the current residual noise in the ear. Then, the DAC converts the digital signal into the electrical signal and transmits the electrical signal to the speaker, and the speaker converts the electrical signal into the sound signal, so as to cancel out the residual noise, thereby achieving the NR effect.

As shown in FIG. 2B, in the ENC part, the biquad filter adaptation may be performed on the original sound source information, the ENC adaptation is performed on a voice signal ranged from 100 Hz to 8 kHz that is selected through the band-pass filter, and signals in other frequency bands are filtered out, thereby preventing the non-voice-segment noise from affecting the voice quality. After the biquad filtering, noise cancellation of NR may be performed, the human voice is retained, and the noise is removed. Since the biquad filter filters some noise before the NR and the NR can be combined with the ANC in the embodiments of the present disclosure, the residual noise is not too much, and the NR processing may be completed within 0 to 30 milliseconds, thereby preventing the user from perceiving two pieces of sound due to too long a delay. Then, the small audio is enhanced through dynamically adjusting the audio output amplitude in multiple frequency bands, and the transient excessive signal is suppressed so as to make the voice signal clearer. Then, the volume of the retained voice may be appropriately adjusted through the gain.

Finally, as shown in FIG. 2B, processing results of the ANC part and the ENC part may be mixed and added, and then the DAC converts the digital signal into the electrical signal and transmits the electrical signal to the speaker for broadcasting, thereby achieving a high definition transparency mode with the clear human voice and noise cancellation.

Figure 2C:
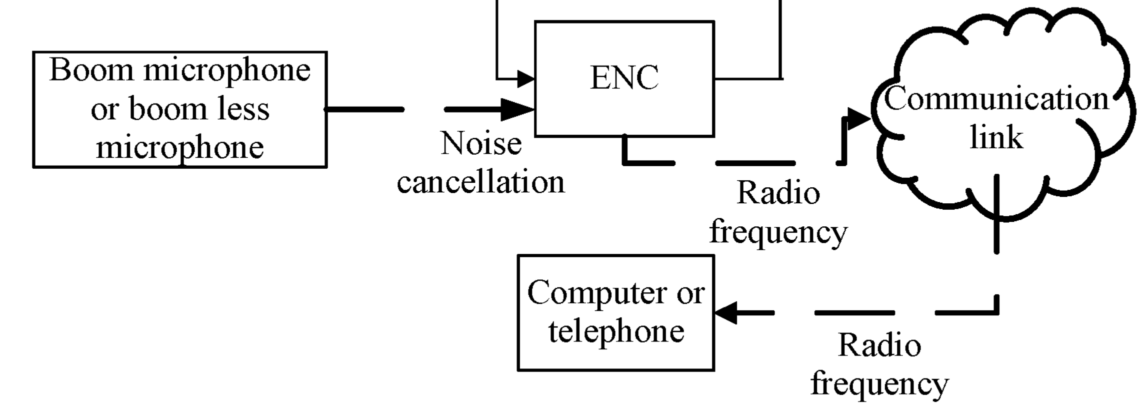
FIG. 2C is a schematic diagram illustrating application scenarios of a noise cancellation method according to embodiment two of the present disclosure.

FIG. 2C is a schematic diagram illustrating application scenarios of a noise cancellation method according to embodiment two of the present disclosure. As shown in FIG. 2C, the noise cancellation method provided in the embodiments of the present disclosure is applicable to a case where the user answers a call. Specifically, the sound processed by the ENC may be used as a general call. When the user needs to speak, a boom microphone or a boom less microphone responsible for collecting sound can perform environmental noise cancellation through the ENC, and a talker at the other end does not hear the noise around the user, thereby providing a better call quality.

In the technical solutions of the embodiments of the present disclosure, acquisition, storage and application of the original sound source information involved are in compliance with relevant laws and regulations and do not violate the public order and good customs.

Embodiment Three

Figure 3:
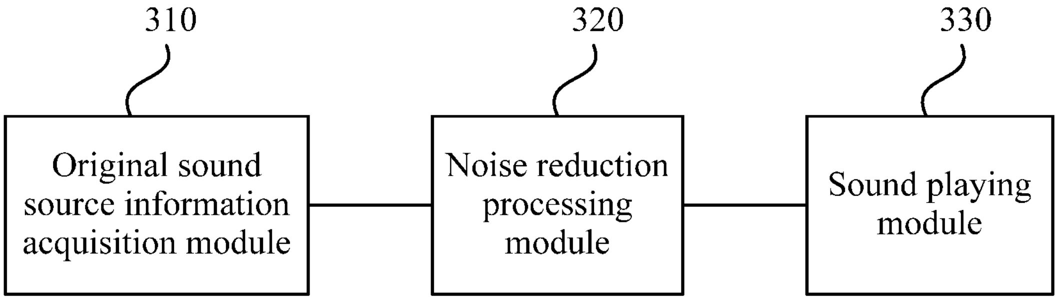
FIG. 3 is a structural diagram of a noise cancellation apparatus according to embodiment three of the present disclosure.

FIG. 3 is a structural diagram of a noise cancellation apparatus according to embodiment three of the present disclosure. As shown in FIG. 3, the apparatus includes an original sound source information acquisition module 310, a noise reduction processing module 320, and a sound playing module 330.

The original sound source information acquisition module 310 is configured to acquire original sound source information.

The noise reduction processing module 320 is configured to perform noise reduction (NR) processing on the original sound source information using active noise cancellation (ANC) to obtain first sound information and perform the NR processing on the original sound source information using environmental noise cancellation (ENC) to obtain second sound information.

The sound playing module 330 is configured to mix and add the first sound information and the second sound information to obtain target sound information and play the target sound information.

In an embodiment, the noise reduction processing module 320 includes an inverted wave signal determination unit and a first sound information determination unit.

The inverted wave signal determination unit is configured to perform noise phase inversion processing on the original sound source information through a phase inverter to obtain an inverted wave signal.

The first sound information determination unit is configured to perform noise cancellation on the original sound source information according to the inverted wave signal to obtain the first sound information.

In an embodiment, the first sound information determination unit includes a target inverted wave signal determination subunit and a first sound information determination subunit.

The target inverted wave signal determination subunit is configured to perform volume adjustment on the inverted wave signal through the gain adjustment to obtain a target inverted wave signal with a magnitude same as a magnitude of a noise in the original sound source information.

The first sound information determination subunit is configured to perform the noise cancellation on the original sound source information according to the target inverted wave signal to obtain the first sound information.

In an embodiment, the apparatus further includes an original sound source information filtering module.

The original sound source information filtering module is configured to, before the noise phase inversion processing is performed on the original sound source information through the phase inverter so as to obtain the inverted wave signal, perform low-pass filtering on the original sound source information to obtain the original sound source information within a first target frequency band.

In an embodiment, the original sound source information filtering module includes an original sound source information filtering unit.

The original sound source information filtering unit is configured to perform the low-pass filtering on the original sound source information through a biquad filter to obtain the original sound source information within the first target frequency band.

In an embodiment, the first target frequency band includes a frequency band ranged from 20 Hz to 4 kHz.

In an embodiment, the noise reduction processing module 320 includes a human voice signal determination unit and a second sound information determination unit.

The human voice signal determination unit is configured to separate human voice from environmental noise in the original sound source information through a software NR algorithm and retain a human voice signal.

The second sound information determination unit is configured to enhance the human voice signal to obtain the second sound information.

In an embodiment, the apparatus further includes another original sound source information filtering module.

The another original sound source information filtering module is configured to, before the human voice is separated from the environmental noise in the original sound source information through the software NR algorithm and the human voice signal is retained, perform band-pass filtering on the original sound source information to obtain the original sound source information within a second target frequency band.

In an embodiment, the another original sound source information filtering module includes an another original sound source information filtering unit.

The another original sound source information filtering unit is configured to perform the band-pass filtering on the original sound source information through a biquad filter to obtain the original sound source information within the second target frequency band.

In an embodiment, the second target frequency band includes a frequency band ranged from 100 Hz to 8 kHz.

In an embodiment, the second sound information determination unit includes a second sound information determination subunit.

The second sound information determination subunit is configured to perform audio enhancement processing and/or volume enhancement processing on the human voice signal to obtain the second sound information.

In an embodiment, the second sound information determination subunit is configured to perform the step described below.

The audio enhancement processing is performed on the human voice signal by dynamically adjusting an audio output amplitude in multiple frequency bands.

In an embodiment, the second sound information determination subunit is further configured to perform the step described below.

The volume enhancement processing is performed on the human voice signal through the gain adjustment.

In an embodiment, the original sound source information acquisition module 310 includes an electrical signal conversion unit and a digital signal conversion unit.

The electrical signal conversion unit is configured to acquire a sound signal of an original sound source through a microphone and convert the sound signal of the original sound source into an electrical signal of the original sound source.

The digital signal conversion unit is configured to convert the electrical signal of the original sound source into a digital signal of the original sound source through an analog-to-digital converter (ADC) and use the digital signal of the original sound source as the original sound source information.

In an embodiment, the sound playing module 330 includes a target sound information determination unit.

The target sound information determination unit is configured to convert the mixed and added sound information into a target electrical signal through a digital-to-analog converter (DAC) and convert the target electrical signal into a target sound signal through a speaker to obtain the target sound information.

The noise cancellation apparatus provided by the embodiment of the present disclosure may perform the noise cancellation method provided by any one of the embodiments of the present disclosure and has functional modules and beneficial effects corresponding to the executed method.

Embodiment Four

Figure 4:
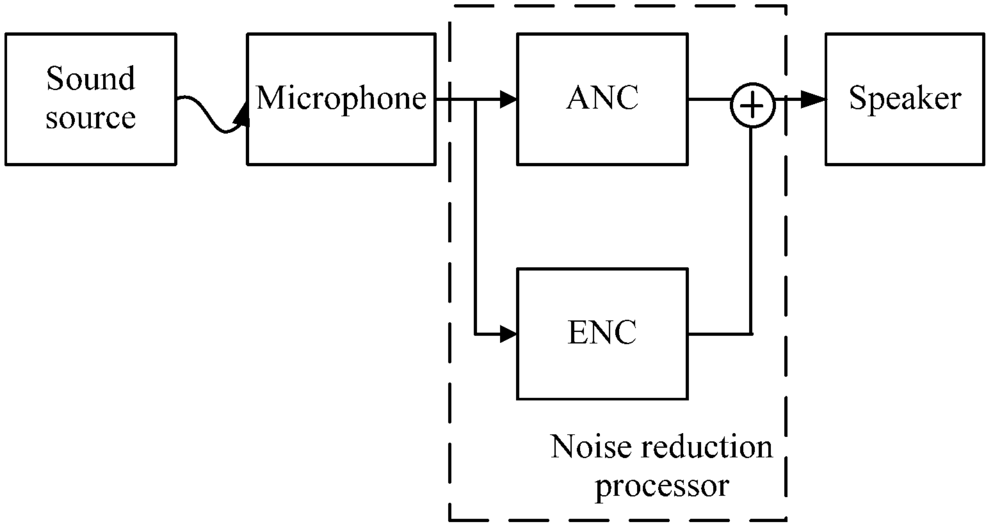
FIG. 4 is a structural diagram of a noise cancellation earphone according to embodiment four of the present disclosure.

FIG. 4 is a structural diagram of a noise cancellation earphone according to embodiment four of the present disclosure. As shown in FIG. 4, a noise cancellation earphone includes a microphone, a noise reduction processor, and a speaker. The microphone is configured to acquire original sound source information.

The noise reduction processor is configured to perform noise reduction (NR) processing on the original sound source information using the noise cancellation method according to any embodiment of the present disclosure to obtain target sound information.

The speaker is configured to play the target sound information using the noise cancellation method according to any embodiment of the present disclosure.

The noise reduction processor can perform noise cancellation using the ANC and the ENC so that the user can hear clear human voice.

The noise cancellation earphone provided in the embodiment of the present disclosure can solve the problem of noisy listening sounds in the transparency mode of the conventional earphone, the auxiliary hearing device, or the hearing aid, enhance the environmental noise cancellation effect, and enhance the human voice so that the user can hear clearer external human voice.

Embodiment Five

Figure 5:
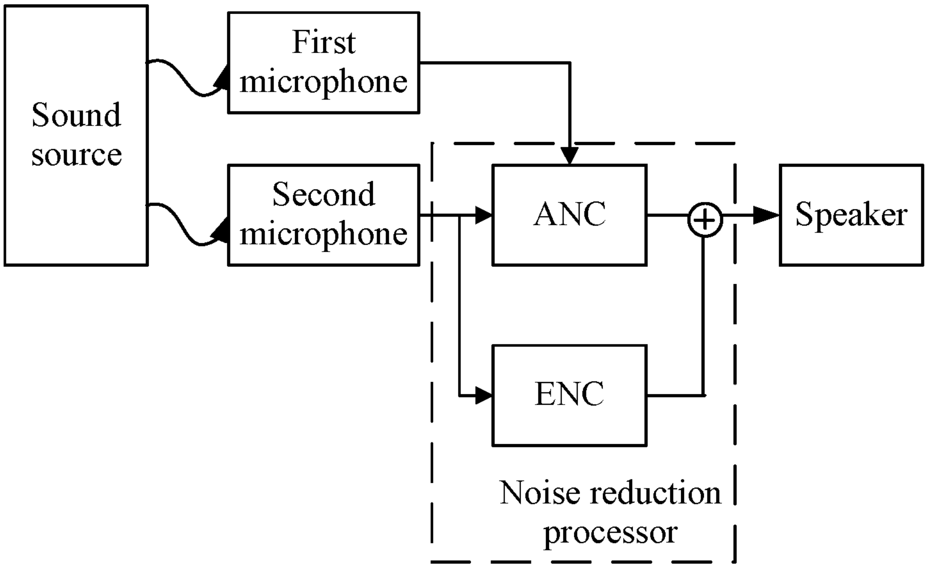
FIG. 5 is a structural diagram of a noise cancellation earphone according to embodiment five of the present disclosure.

FIG. 5 is a structural diagram of a noise cancellation earphone according to embodiment five of the present disclosure. As shown in FIG. 5, a noise cancellation earphone includes a first microphone, a second microphone, a noise reduction processor, and a speaker. The first microphone is configured to acquire first sound source information.

The second microphone is configured to acquire second sound source information.

The noise reduction processor is configured to perform active noise cancellation (ANC) noise reduction (NR) processing on the first sound source information according to the second sound source information to obtain third sound information.

The noise reduction processor is further configured to use the first sound source information as original sound source information and perform environmental noise cancellation (ENC) NR processing using the noise cancellation method according to any embodiment of the present disclosure to obtain second sound information.

The noise reduction processor is further configured to mix and add the third sound information and the second sound information to obtain target sound information.

The speaker is configured to play the target sound information using the noise cancellation method according to any embodiment of the present disclosure.

The first microphone may be an FB microphone and the second microphone may be an FF microphone. The FB microphone can enhance the noise cancellation effect of the ANC, while the original FF microphone is mainly configured to receive noise and voice. The third sound information may be information obtained after noise cancellation of the ANC is enhanced by the FB microphone and may be a result after the first sound information is optimized.

In other words, the noise cancellation method provided in the embodiment of the present disclosure can be applied to a hybrid earphone (hybrid ANC), and the hybrid ANC is improved so as to improve the NR effect of the hybrid ANC, so that the user can hear clearer sound while the following is avoided: an operation rate is affected, resulting in that the user perceives two pieces of sound.

Embodiment Six

Figure 6:
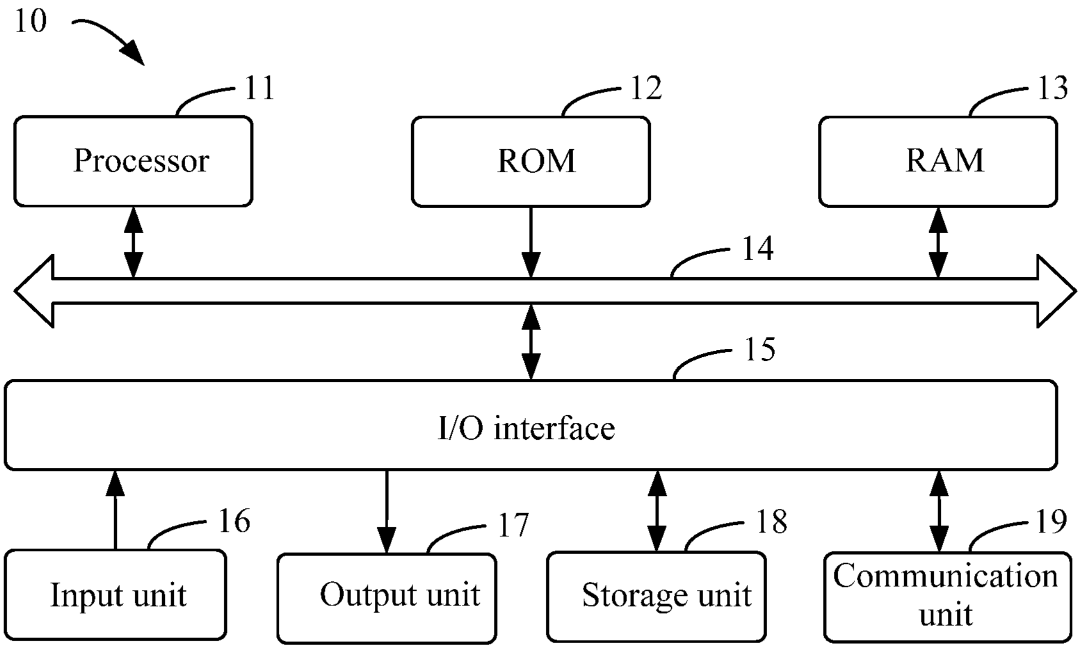
FIG. 6 is a structural diagram of an electronic device for implementing a noise cancellation method according to an embodiment of the present disclosure.

FIG. 6 is a structural diagram of an electronic device 10 for implementing the embodiments of the present disclosure. The electronic device is intended to represent various forms of digital computers, for example, a laptop computer, a desktop computer, a workbench, a personal digital assistant, a server, a blade server, a mainframe computer, or another applicable computer. The electronic device may also represent various forms of mobile apparatuses, for example, a personal digital assistant, a cellphone, a smartphone, a wearable device (such as a helmet, glasses, and a watch), or a similar computing apparatus. Herein the shown components, the connections and relationships between these components, and the functions of these components are illustrative only and are not intended to limit the implementation of the present disclosure as described and/or claimed herein.

As shown in FIG. 6, the electronic device 10 includes at least one processor 11 and a memory (such as a read-only memory (ROM) 12 and a random-access memory (RAM) 13) communicatively connected to the at least one processor 11. The memory stores a computer program executable by the at least one processor, and the processor 11 may perform various types of appropriate operations and processing according to a computer program stored in a ROM 12 or a computer program loaded from a storage unit 18 to a RAM 13. Various programs and data required for the operation of the electronic device 10 are also stored in the RAM 13. The processors 11, the ROM 12, and the RAM 13 are connected to each other through a bus 14. An input/output (I/O) interface 15 is also connected to the bus 14.

Multiple components in the electronic device 10 are connected to the I/O interface 15. The multiple components include an input unit 16 such as a keyboard or a mouse, an output unit 17 such as various types of displays or speakers, the storage unit 18 such as a magnetic disk or an optical disk, and a communication unit 19 such as a network card, a modem or a wireless communication transceiver. The communication unit 19 allows the electronic device 10 to exchange information/data with other devices over a computer network such as the Internet and/or various telecommunications networks.

The processor 11 may be various general-purpose and/or special-purpose processing components having processing and computing capabilities. Examples of the processor 11 include, but are not limited to, a central processing unit (CPU), a graphics processing unit (GPU), a special-purpose artificial intelligence (AI) computing chip, a processor executing machine learning models and algorithms, a digital signal processor (DSP), and any appropriate processor, controller and microcontroller. The processor 11 performs the various methods and processing described above, such as the noise cancellation method.

In some examples, the noise cancellation method may be implemented as computer programs tangibly contained in a computer-readable storage medium such as the storage unit 18. In some embodiments, part or all of computer programs may be loaded and/or installed onto the electronic device 10 via the ROM 12 and/or the communication unit 19. When the computer programs are loaded to the RAM 13 and executed by the processor 11, one or more steps of the preceding noise cancellation method may be performed. Alternatively, in other embodiments, the processor 11 may be configured, in any other suitable manner (for example, by means of firmware), to perform the noise cancellation method.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs may be executable and/or interpretable on a programmable system including at least one programmable processor. The programmable processor may be a special-purpose or general-purpose programmable processor for receiving data and instructions from a memory system, at least one input apparatus and at least one output apparatus and transmitting the data and instructions to the memory system, the at least one input apparatus and the at least one output apparatus.

Computer programs for implementation of the methods of the present disclosure may be written in one programming language or any combination of multiple programming languages. These computer programs may be provided for a processor of a general-purpose computer, a special-purpose computer or another programmable data processing apparatus such that the computer programs, when executed by the processor, cause functions/operations specified in the flowcharts and/or block diagrams to be implemented. The computer programs may be executed entirely on a machine, partly on a machine, as a stand-alone software package, partly on a machine and partly on a remote machine, or entirely on a remote machine or a server.

In the context of the present disclosure, the computer-readable storage medium may be a tangible medium including or storing a computer program that is used by or used in conjunction with an instruction execution system, apparatus or device. The computer-readable storage medium may include, but is not limited to, an electronic, magnetic, optical, electromagnetic, infrared or semiconductor system, apparatus or device, or any suitable combination thereof. Alternatively, the computer-readable storage medium may be a machine-readable signal medium. Concrete examples of the machine-readable storage medium include an electrical connection based on one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any suitable combination thereof.

In order that interaction with a user is provided, the systems and techniques described herein may be implemented on the electronic device. The electronic device has a display device (for example, a cathode-ray tube (CRT) or a liquid-crystal display (LCD) monitor) for displaying information to the user; and a keyboard and a pointing device (for example, a mouse or a trackball) through which the user can provide input for the electronic device. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network, and the Internet.

The computing system may include a client and a server. The client and the server are usually far away from each other and generally interact through the communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service.

It is to be understood that various forms of the preceding flows may be used with steps reordered, added, or removed. For example, the steps described in the present disclosure may be performed in parallel, in sequence, or in a different order as long as the desired result of the technical solutions provided in the present disclosure can be achieved. The execution sequence of these steps is not limited herein.

The scope of the present disclosure is not limited to the preceding embodiments. It is to be understood by those skilled in the art that various modifications, combinations, sub-combinations, and substitutions may be made according to design requirements and other factors. Any modification, equivalent substitution, improvement and the like made within the spirit and principle of the present disclosure fall within the scope of the present disclosure.

What is claimed is:

1. A noise cancellation method, comprising:

acquiring original sound source information; and performing noise reduction (NR) processing on the original sound source information using active noise cancellation (ANC) to obtain first sound information and performing NR processing on the original sound source information using environmental noise cancellation (ENC) to obtain second sound information;

wherein performing the NR processing on the original sound source information using the ANC to obtain the first sound information comprises:

performing noise phase inversion processing on the original sound source information through a phase inverter to obtain an inverted wave signal;

performing noise cancellation on the original sound source information according to the inverted wave signal to obtain the first sound information; and mixing and adding the first sound information and the second sound information to obtain target sound information and playing the target sound information;

wherein performing the NR processing on the original sound source information using the ENC to obtain the second sound information comprises:

separating human voice from environmental noise in the original sound source information through a software NR algorithm and retaining a human voice signal; and performing enhancement processing on the human voice signal to obtain the second sound information;

wherein enhancing the human voice signal to obtain the second sound information comprises:

performing at least one of audio enhancement processing or volume enhancement processing on the human voice signal to obtain the second sound information; and wherein the human voice is separated from the environmental noise in the original sound source information through the software NR algorithm within 0 to 30 milliseconds and the human voice signal is retained.

2. The method of claim 1, wherein performing the noise cancellation on the original sound source information according to the inverted wave signal to obtain the first sound information comprises:

performing volume adjustment on the inverted wave signal through a gain adjustment to obtain a target inverted wave signal with a magnitude same as a magnitude of a noise in the original sound source information; and performing the noise cancellation on the original sound source information according to the target inverted wave signal to obtain the first sound information.

3. The method of claim 1, wherein before performing the noise phase inversion processing on the original sound source information through the phase inverter to obtain the inverted wave signal, the method further comprises:

performing low-pass filtering on the original sound source information to obtain the original sound source information within a first target frequency band.

4. The method of claim 3, wherein performing the low-pass filtering on the original sound source information to obtain the original sound source information within the first target frequency band comprises:

performing the low-pass filtering on the original sound source information through a biquad filter to obtain the original sound source information within the first target frequency band.

5. The method of claim 4, wherein the first target frequency band comprises a frequency band ranged from 20 Hz to 4 kHz.

6. The method of claim 1, wherein before separating the human voice from the environmental noise in the original sound source information through the software NR algorithm and retaining the human voice signal, the method further comprises:

performing band-pass filtering on the original sound source information to obtain the original sound source information within a second target frequency band.

7. The method of claim 6, wherein performing the band-pass filtering on the original sound source information to obtain the original sound source information within the second target frequency band comprises:

performing the band-pass filtering on the original sound source information through a biquad filter to obtain the original sound source information within the second target frequency band.

8. The method of claim 6, wherein the second target frequency band comprises a frequency band from 100 Hz to 8 kHz.

9. The method of claim 1, wherein performing at least one of the audio enhancement processing or the volume enhancement processing on the human voice signal comprises:

performing the audio enhancement processing on the human voice signal by dynamically adjusting an audio output amplitude in a plurality of frequency bands.

10. The method of claim 9, wherein mixing and adding the first sound information and the second sound information to obtain the target sound information comprises:

converting mixed and added sound information into a target electrical signal through a digital-to-analog converter (DAC) and converting the target electrical signal into a target sound signal through a speaker to obtain the target sound information.

11. The method of claim 1, wherein performing the audio enhancement processing and/or the volume enhancement processing on the human voice signal comprises:

performing the volume enhancement processing on the human voice signal through a gain adjustment.

12. The method of claim 1, wherein acquiring the original sound source information comprises:

acquiring a sound signal of an original sound source through a microphone and converting the sound signal of the original sound source into an electrical signal of the original sound source; and converting the electrical signal of the original sound source into a digital signal of the original sound source through an analog-to-digital converter (ADC) and using the digital signal of the original sound source as the original sound source information.

13. A noise cancellation earphone, comprising: a microphone, a noise reduction processor, and a speaker, wherein the microphone is configured to acquire original sound source information;

the noise reduction processor is configured to perform noise reduction (NR) processing on the original sound source information using the method of claim 1 to obtain target sound information; and the speaker is configured to play the target sound information using the method of claim 1.

14. A noise cancellation earphone, comprising: a first microphone, a second microphone, a noise reduction processor, and a speaker, wherein the first microphone is configured to acquire first sound source information;

the second microphone is configured to acquire second sound source information;

the noise reduction processor is configured to perform active noise cancellation (ANC) noise reduction (NR) processing on the first sound source information according to the second sound source information to obtain third sound information;

the noise reduction processor is further configured to use the first sound source information as original sound source information and perform environmental noise cancellation (ENC) NR processing using the method of claim 1 to obtain second sound information;

the noise reduction processor is further configured to mix and add the third sound information and the second sound information to obtain target sound information; and the speaker is configured to play the target sound information using the method of claim 1.

15. A non-transitory computer-readable storage medium, which is configured to store a computer instruction which, when executed by a processor, causes the processor to perform the noise cancellation method of claim 1.

16. An electronic device, comprising:

at least one processor; and a memory communicatively connected to the at least one processor;

wherein the memory stores a computer program executable by the at least one processor to enable the at least one processor to perform:

acquiring original sound source information; and performing noise reduction (NR) processing on the original sound source information using active noise cancellation (ANC) to obtain first sound information and performing NR processing on the original sound source information using environmental noise cancellation (ENC) to obtain second sound information;

wherein performing the NR processing on the original sound source information using the ANC to obtain the first sound information comprises:

performing noise phase inversion processing on the original sound source information through a phase inverter to obtain an inverted wave signal;

performing noise cancellation on the original sound source information according to the inverted wave signal to obtain the first sound information; and mixing and adding the first sound information and the second sound information to obtain target sound information and playing the target sound information;

wherein performing the NR processing on the original sound source information using the ENC to obtain the second sound information comprises:

separating human voice from environmental noise in the original sound source information through a software NR algorithm and retaining a human voice signal; and performing enhancement processing on the human voice signal to obtain the second sound information;

wherein enhancing the human voice signal to obtain the second sound information comprises:

performing at least one of audio enhancement processing or volume enhancement processing on the human voice signal to obtain the second sound information; and wherein the human voice is separated from the environmental noise in the original sound source information through the software NR algorithm within 0 to 30 milliseconds and the human voice signal is retained.

* * * * *